(12) United States Patent
Taxacher et al.

(10) Patent No.: US 10,711,637 B2
(45) Date of Patent: Jul. 14, 2020

(54) TURBINE COMPONENT ASSEMBLY

(71) Applicant: GENERAL ELECTRIC COMPANY, Schenectady, NY (US)

(72) Inventors: Glenn Curtis Taxacher, Simpsonville, SC (US); Bruce Badding, Simpsonville, SC (US); Herbert Chidsey Roberts, III, Middletown, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 157 days.

(21) Appl. No.: 15/624,196

(22) Filed: Jun. 15, 2017

(65) Prior Publication Data

US 2018/0363497 A1 Dec. 20, 2018

(51) Int. Cl.
*F01D 25/00* (2006.01)
*C04B 37/02* (2006.01)
(Continued)

(52) U.S. Cl.
CPC .......... *F01D 25/005* (2013.01); *C04B 37/021* (2013.01); *C04B 37/026* (2013.01); *F01D 9/04* (2013.01); *F23R 3/002* (2013.01); *F23R 3/007* (2013.01); *C04B 2237/12* (2013.01); *C04B 2237/38* (2013.01); *C04B 2237/385* (2013.01); *C04B 2237/40* (2013.01); *C04B 2237/406* (2013.01); *C04B 2237/84* (2013.01); *F05D 2220/30* (2013.01); *F05D 2240/11* (2013.01); *F05D 2240/35* (2013.01); *F05D 2300/172* (2013.01); *F05D 2300/173* (2013.01); *F05D 2300/6012* (2013.01); *F05D 2300/6033* (2013.01)

(58) Field of Classification Search
CPC ...... F01D 25/005; F01D 25/04; F01D 25/243; F01D 25/246; F01D 9/04; F01D 9/02; F01D 9/042; F01D 9/047; F23R 3/002; F23R 3/007; C04B 35/803; C04B 35/806; C04B 2235/3217; C04B 2235/3826; C04B 2235/3873; C04B 2235/5244; C04B 2235/5248; C04B 2237/12; C04B 2237/38; C04B 2237/40; F05D 2220/30; F05D 2240/35; F05D 2230/172; F05D 2230/173; F05D 2230/6012; F05D 2230/6033
See application file for complete search history.

(56) References Cited

U.S. PATENT DOCUMENTS 6,315,519 B1 * 11/2001 Bagepalli ................ F01D 11/08
  415/135
6,702,553 B1 * 3/2004 Gorman .................. C23C 26/02
  277/345

(Continued)

*Primary Examiner* — Ehud Gartenberg
*Assistant Examiner* — Jacek Lisowski
(74) *Attorney, Agent, or Firm* — McNees Wallac & Nurick LLC

(57) ABSTRACT

A turbine component assembly is disclosed, including a first component, a second component, and an interface shield. The first component is arranged to be disposed adjacent to a hot gas path, and includes a ceramic matrix composite composition. The second component is adjacent to the first component and arranged to be disposed distal from the hot gas path across the first component. The interface shield is disposed on a contact region of the first component, and directly contacts the second component.

19 Claims, 1 Drawing Sheet

(51) Int. Cl.
*F01D 9/04* (2006.01)
*F23R 3/00* (2006.01)

(56) References Cited

U.S. PATENT DOCUMENTS

| | | | |
|---|---|---|---|
| 6,758,653 B2 | 7/2004 | Morrison | |
| 7,249,462 B2 * | 7/2007 | Aumont | F01D 9/023 415/209.3 |
| 8,052,155 B2 * | 11/2011 | Amos | F16J 15/0887 277/626 |
| 8,167,546 B2 | 5/2012 | Shi et al. | |
| 2007/0184297 A1 * | 8/2007 | Nardi | C23C 4/02 428/650 |
| 2009/0115141 A1 | 5/2009 | Simmons | |
| 2009/0304503 A1 * | 12/2009 | Bergander | F01D 25/246 415/209.3 |
| 2013/0251515 A1 * | 9/2013 | Floyd | F01D 11/18 415/200 |
| 2014/0352323 A1 * | 12/2014 | Bennett | F02C 7/28 60/799 |
| 2014/0363283 A1 * | 12/2014 | Guemmer | F01D 9/041 415/208.1 |
| 2015/0345308 A1 * | 12/2015 | Roberts, Jr. | F01D 11/001 416/212 A |
| 2016/0047549 A1 * | 2/2016 | Landwehr | F23R 3/007 60/753 |
| 2016/0146053 A1 * | 5/2016 | McCaffrey | F01D 25/246 415/173.1 |
| 2016/0319841 A1 * | 11/2016 | McCaffrey | F01D 11/24 |

\* cited by examiner

TURBINE COMPONENT ASSEMBLY

FIELD OF THE INVENTION

The present invention is directed to turbine component assemblies. More particularly, the present invention is directed to turbine component assemblies including interface shields.

BACKGROUND OF THE INVENTION

Hot gas path components of gas turbines are subjected to high air loads and high acoustic loads during operation which, combined with the elevated temperatures and harsh environments, may damage the components over time. Both metal and ceramic matrix composite ("CMC") components may be vulnerable to such damage, although CMC components are typically regarded as being more susceptible than metallic counterparts, particularly where CMC components are adjacent to metallic components.

Damage from air loads and acoustic loads may be pronounced in certain components, such as turbine shrouds, which include a hot gas path-facing sub-component which is not fully secured to, but in contact with, a non-hot gas path-facing sub-component. By way of example, due to air loads and acoustic loads, the inner shroud of a turbine shroud assembly may vibrate against and be damaged by the outer shroud during operation. Further, loading an inner shroud to dampen air loads and acoustic loads may give rise to thermal binding between the CMC components and metal components, which can further damage the components.

BRIEF DESCRIPTION OF THE INVENTION

In an exemplary embodiment, a turbine component assembly includes a first component, a second component, and an interface shield. The first component is arranged to be disposed adjacent to a hot gas path, and includes a CMC composition. The second component is adjacent to the first component and arranged to be disposed distal from the hot gas path across the first component. The interface shield is disposed on a contact region of the first component, and directly contacts the second component.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary turbine component assemblies. Embodiments of the present disclosure, in comparison to articles not utilizing one or more features disclosed herein, decrease costs, improve mechanical properties, increase component life, decrease maintenance requirements, eliminate spring coil failure, reduce or eliminate thermal binding, or combinations thereof.

Figure 1:
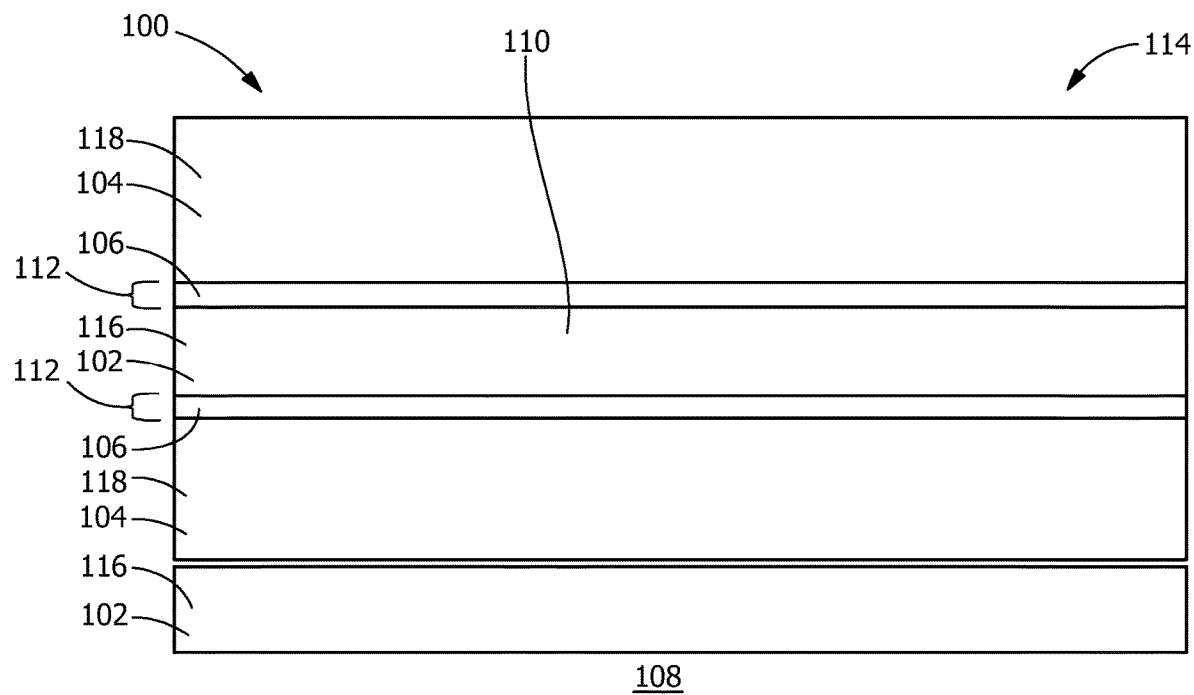
FIG. 1 is a cross-sectional view of a turbine component assembly, according to an embodiment of the present disclosure.
Figure 2:
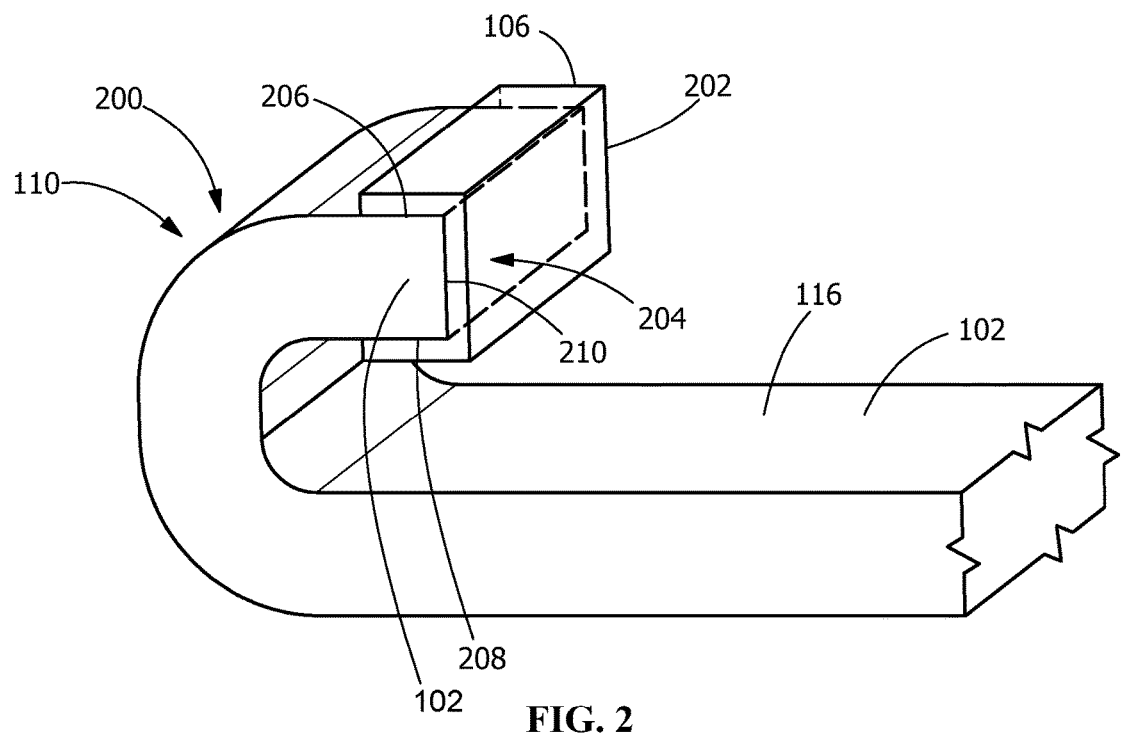
FIG. 2 is a perspective view of the interface shield disposed on the first component of FIG. 1, according to an embodiment of the present disclosure.

Referring to FIGS. 1-2, in one embodiment, a turbine component assembly 100 includes a first component 102, a second component 104, and an interface shield 106. The first component 102 is arranged to be disposed adjacent to a hot gas path 108, the first component 102 including a CMC composition. The second component 104 is adjacent to the first component 102 and arranged to be disposed distal from the hot gas path 108 across the first component 102. The interface shield 106 is disposed on a contact region 110 of the first component 102, and directly contacts the second component 104.

The interface shield 106 may include a higher wear resistance than the first component 102 and second component 104 alone, a higher damping capability than the first component 102 and the second component 104 alone, or both.

The first component 102 may include any suitable CMC composition, including, but not limited to, CMCs, aluminum oxide-fiber-reinforced aluminum oxides (Ox/Ox), carbon-fiber-reinforced silicon carbides (C/SiC), silicon-carbide-fiber-reinforced silicon carbides (SiC/SiC), carbon-fiber-reinforced silicon nitrides (C/$Si_3N_4$), silicon-carbide-fiber-reinforced silicon nitrides (SiC/$Si_3N_4$), or combinations thereof.

The second component 104 may include any suitable composition, including, but not limited to, a metallic composition. Suitable metallic compositions may include, but are not limited to, iron alloys, steels, stainless steels, carbon steels, nickel alloys, superalloys, nickel-based superalloys, INCONEL 718, INCONEL 738, INCONEL X-750, René 41, cobalt-based superalloys, cobalt L-605, or combinations thereof.

The interface shield 106 may include any suitable composition, including, but not limited to, cobalt alloys, CoCrNiWC systems, cobalt L-605, STELLITE 720 ULTRAFLEX, STELLITE 6, STELLITE 6B, STELLITE 6K, STELLITE 21, TRIBALLOY T-400, TRIBALLOY T-400C, TRIBALLOY T-800, X-40, X-45, FSX-414, copper alloys, MONEL alloys, MONEL 400, MONEL 401, MONEL 404, MONEL K-500, MONEL 405, aluminum bronzes, INCONEL 625, INCONEL 718, INCONEL 738, or combinations thereof.

The interface shield 106 may include any suitable microstructure, including, but not limited to, a wrought structure, a powder metallurgy structure, a cast structure, an investment-cast structure, an air-melted structure, or combinations thereof.

In one embodiment, the interface shield 106 includes a hard wear surface coating disposed such that the hard wear surface coating directly contacts the second component 104. The hard wear surface coating may include any suitable coating composition, including, but not limited to, STELLITE 720 ULTRAFLEX, STELLITE 6, STELLITE 6B, STELLITE 6K, STELLITE 21, TRIBALLOY T-400, TRIBALLOY T-400C, TRIBALLOY T-800, X-40, X-45, FSX-414, copper alloys, MONEL alloys, MONEL 400, MONEL 401, MONEL 404, MONEL K-500, MONEL 405, aluminum bronzes, INCONEL 625, INCONEL 718, INCONEL 738, or combinations thereof.

The hard wear surface coating may include any suitable microstructure, including, but not limited to, a plasma-sprayed structure, an HVOF sprayed structure, a plated structure, a plasma-sprayed structure, an air-melted structure, or combinations thereof.

As used herein, "cobalt L-605" refers to an alloy including a composition, by weight, of about 20% chromium, about 10% nickel, about 15% tungsten, about 0.1% carbon, about 1.5% manganese, and a balance of cobalt. Cobalt L-605 is available from Special Metals Corporation, 3200 Riverside Drive, Huntington, W. Va. 25720.

As used herein, "FSX-414" refers to an alloy including a composition, by weight, of about 29% chromium, about 7% tungsten, about 10% nickel, about 0.6% carbon, and a balance of cobalt. FSX-414 is commercially available under that designation As used herein, "INCONEL 625" refers to an alloy including a composition, by weight, of about 21.5% chromium, about 5% iron, about 9% molybdenum, about 3.65% niobium, about 1% cobalt, about 0.5% manganese, about 0.4% aluminum, about 0.4% titanium, about 0.5% silicon, about 0.1% carbon, and a balance of nickel. INCONEL 625 is available from Special Metals Corporation, 3200 Riverside Drive, Huntington, W. Va. 25720.

As used herein, "INCONEL 718" refers to an alloy including a composition, by weight, of about 19% chromium, about 18.5% iron, about 3% molybdenum, about 3.6% niobium and tantalum, and a balance of nickel. INCONEL 718 is available from Special Metals Corporation, 3200 Riverside Drive, Huntington, W. Va. 25720.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel. INCONEL 738 is available from Special Metals Corporation, 3200 Riverside Drive, Huntington, W. Va. 25720.

As used herein, "INCONEL X-750" refers to an alloy including a composition, by weight, of about 15.5% chromium, about 7% iron, about 2.5% titanium, about 0.7% aluminum, and about 0.5% niobium and tantalum, and a balance of nickel. INCONEL X-750 is available from Special Metals Corporation, 3200 Riverside Drive, Huntington, W. Va. 25720.

As used herein, "MONEL 400" refers to an alloy including a composition, by weight, of at least about 63% nickel, up to about 2.5% iron, up to about 2% manganese, up to about 0.5% silicon, and a balance of copper. MONEL 400 is available from Special Metals Corporation, 3200 Riverside Drive, Huntington, W. Va. 25720.

As used herein, "MONEL 401" refers to an alloy including a composition, by weight, of at least about 63% nickel, up to about 2.5% iron, up to about 2% manganese, and a balance of copper. MONEL 401 is available from Special Metals Corporation, 3200 Riverside Drive, Huntington, W. Va. 25720.

As used herein, "MONEL 404" refers to an alloy including a composition, by weight, of about 54.5% nickel, up to about 0.5% iron, up to about 0.1% manganese, up to about 0.1% silicon, up to about 0.05% aluminum, and a balance of copper. MONEL 404 is available from Special Metals Corporation, 3200 Riverside Drive, Huntington, W. Va. 25720.

As used herein, "MONEL K-500" refers to an alloy including a composition, by weight, of at least about 63% nickel, up to about 2% iron, up to about 1.5% manganese, up to about 0.5% silicon, about 2.75% aluminum, about 0.6% titanium, and a balance of copper. MONEL K-500 is available from Special Metals Corporation, 3200 Riverside Drive, Huntington, W. Va. 25720.

As used herein, "MONEL 405" refers to an alloy including a composition, by weight, of at least about 63% nickel, up to about 2.5% iron, up to about 2% manganese, up to about 0.5% silicon, up to about 0.05% aluminum, and a balance of copper. MONEL 405 is available from Special Metals Corporation, 3200 Riverside Drive, Huntington, W. Va. 25720.

As used herein, "René 41" refers to an alloy including a composition, by weight, of about 19% chromium, about 11% cobalt, about 10% molybdenum, about 1.5% aluminum, about 3.1% titanium, and a balance of nickel. René 41 is commercially available under that designation.

As used herein "STELLITE 6" refers to an alloy including, by weight, about 30% chromium, about 4.5% tungsten, about 1.2% carbon, and a balance of cobalt. STELLITE 21 ULTRAFLEX is available from Deloro Wear Solutions GmbH, Zur Bergpflege 51-53, 56070 Koblenz, Germany.

As used herein "STELLITE 6B" refers to an alloy including, by weight, about 29% chromium, about 4.5% tungsten, about 1.2% carbon, and a balance of cobalt. STELLITE 21 ULTRAFLEX is available from Deloro Wear Solutions GmbH, Zur Bergpflege 51-53, 56070 Koblenz, Germany.

As used herein "STELLITE 6K" refers to an alloy including, by weight, about 30% chromium, about 4.5% tungsten, about 1.7% carbon, and a balance of cobalt. STELLITE 21 ULTRAFLEX is available from Deloro Wear Solutions GmbH, Zur Bergpflege 51-53, 56070 Koblenz, Germany.

As used herein "STELLITE 21" refers to an alloy including, by weight, about 28% chromium, about 3% nickel, about 5.2% molybdenum, about 0.25% carbon, and a balance of cobalt. STELLITE 21 ULTRAFLEX is available from Deloro Wear Solutions GmbH, Zur Bergpflege 51-53, 56070 Koblenz, Germany.

As used herein "STELLITE 720 ULTRAFLEX" refers to an alloy including, by weight, about 33% chromium, about 2.45% carbon, about 18% molybdenum, about 0.5% silicon, and a balance of cobalt. STELLITE 720 ULTRAFLEX is available from Deloro Wear Solutions GmbH, Zur Bergpflege 51-53, 56070 Koblenz, Germany.

As used herein, "TRIBALOY T-400" refers to an alloy including a composition, by weight, of about 8.5% chromium, about 28% molybdenum, about 2.5% silicon, and a balance of cobalt. TRIBALOY T-800 is available from Kennametal Inc., 1662 MacMillan Park Drive, Fort Mill, S.C. 29707.

As used herein, "TRIBALOY T-400C" refers to an alloy including a composition, by weight, of about 14% chromium, about 27% molybdenum, about 2.6% silicon, and a balance of cobalt. TRIBALOY T-800 is available from Kennametal Inc., 1662 MacMillan Park Drive, Fort Mill, S.C. 29707.

As used herein, "TRIBALOY T-800" refers to an alloy including a composition, by weight, of about 18% chromium, about 28% molybdenum, about 3.4% silicon, and a balance of cobalt. TRIBALOY T-800 is available from Kennametal Inc., 1662 MacMillan Park Drive, Fort Mill, S.C. 29707.

As used herein, "X-40" refers to an alloy including a composition, by weight, of about 10% nickel, about 25% chromium, about 7.5% tungsten, about 0.45% carbon, and a balance of cobalt. X-40 is commercially available under that designation.

As used herein, "X-45" refers to an alloy including a composition, by weight, of about 10% nickel, about 25% chromium, about 7.5% tungsten, about 0.5% manganese, about 0.9% silicon, and a balance of cobalt. X-45 is commercially available under that designation.

The interface shield 106 may be disposed on the contact region 110 of the first component 102 in any suitable manner, and the interface shield 106 may be removably secured to the first component 102 or irreversibly secured to the first component. As used herein, "removably secured" indicates that the removal of the interface shield 106 from the first component 102 may be effected without the removal damaging the interface shield 106 or the first component 102. In contrast, "irreversibly secured" indicates that the removal of the interface shield 106 from the first component 102 may be effected only with the concurrent damaging of at least one of the interface shield 106 and the first component 102.

In one embodiment, the interface shield 106 is mechanically secured to the first component 102. The interface shield 106 may be mechanically secured to the first component 102 by any suitable fitting or joint, including, but not limited to, compression of the interface shield 106 on the first component 102 due to the conformations of the interface shield 106 and the first component 102.

In one embodiment, the interface shield 106 is bonded to the first component 102. The interface shield 106 may be bonded to the first component 102 by any suitable bond, including, but not limited to, an adhesive bond, a braze bond, a weld bond, a sintered bond, a reaction/diffusion bond, or combinations thereof.

In one embodiment, the interface shield 106 is co-cast on the first component 102. Co-casting of the interface shield 106 on the first component 102 may include inserting the interface shield 106 into a mold such that the contact region 110 is disposed within a cavity in the mold, the cavity having a conformation to cast the interface shield 106 onto the first component 102. The interface shield 106 may be machined to net shape following the co-casting or may be cast in near-net or net shape.

The disposal of the interface shield 106 on the first component 102 may include any suitable combination of mechanically securing, bonding, and/or co-casting.

The turbine component assembly 100 may include a single interface shield 106 disposed on a single of contact region 110 of the first component 102 and directly contacting the second component 104, or a plurality of interface shields 106 disposed on a plurality of contact regions 110 of the first component 102 and directly contacting the second component 104. In a further embodiment, an interface 112 between the first component 102 and the second component 104 consists of the single interface shield 106 or the plurality of interface shields 106. In one embodiment, the interface 112 and the interface shield 106 are free of spring coils, elastomers, and woven metal meshes.

The first component 102 includes a first coefficient of thermal expansion, and the second component 104 includes a second coefficient of thermal expansion. In one embodiment, wherein the first coefficient of thermal expansion is distinct from the second coefficient of thermal expansion, the turbine component assembly 100 includes a coefficient of thermal expansion variance.

In one embodiment, the interface shield 106 reduces thermal binding under operating conditions relative to a comparative assembly not including the interface shield 106. In another embodiment, the interface shield 106 reduces wear of the first component 102 under operating conditions relative to a comparative assembly not including the interface shield 106.

The turbine component assembly 100 may be any suitable apparatus, including, but not limited to, a shroud assembly 114 wherein the first component 102 is an inner shroud 116 and the second component 104 is an outer shroud 118, a nozzle assembly (not shown) wherein the first component 102 is a nozzle end wall and the second component 104 is a nozzle outer wall, or a combustor (not shown) wherein the first component 102 is a combustor liner and the second component 104 is a combustor case.

Referring to FIG. 2, in one embodiment, wherein the turbine component assembly 100 is a shroud assembly 114 wherein the first component 102 is an inner shroud 116 and the second component 104 is an outer shroud 118, the contact region 110 is a hook region 200 of the inner shroud 116. In a further embodiment, the interface shield 106 is an interface clip 202, and the interface clip 202 includes u-shaped cross-section 204 which contacts the hook region 200 with a first surface 206, a second surface 208, and a third surface 210.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbine component assembly, comprising:
   a first component arranged to be disposed adjacent to a hot gas path, the first component including a ceramic matrix composite (CMC) composition;
   a second component adjacent to the first component and arranged to be disposed distal from the hot gas path across the first component; and
   an interface shield disposed on a contact region of the first component, the interface shield directly contacting the second component,
   wherein the turbine component assembly is a shroud assembly,
   wherein the interface shield is free of spring coils, elastomers, and woven metal meshes,
   wherein the turbine component assembly including the interface shield includes a higher wear resistance than a comparative assembly not including the interface shield disposed between the first component and the second component, and
   wherein the interface shield reduces thermal binding relative to the comparative assembly.

2. The turbine component assembly of claim 1, wherein the interface shield includes a higher damping capability than the first component and the second component alone.

3. The turbine component assembly of claim 1, wherein the interface shield includes a material composition selected from the group consisting of:
   cobalt alloys,
   CoCrNiWC systems,
   an alloy including a composition, by weight, of about 20% chromium, about 10% nickel, about 15% tungsten, about 0.1% carbon, about 1.5% manganese, and a balance of cobalt;
   an alloy including, by weight, about 33% chromium, about 2.45% carbon, about 18% molybdenum, about 0.5% silicon, and a balance of cobalt;

an alloy including, by weight, about 30% chromium, about 4.5% tungsten, about 1.2% carbon, and a balance of cobalt;

an alloy including, by weight, about 29% chromium, about 4.5% tungsten, about 1.2% carbon, and a balance of cobalt;

an alloy including, by weight, about 30% chromium, about 4.5% tungsten, about 1.7% carbon, and a balance of cobalt;

an alloy including, by weight, about 28% chromium, about 3% nickel, about 5.2% molybdenum, about 0.25% carbon, and a balance of cobalt;

an alloy including a composition, by weight, of about 8.5% chromium, about 28% molybdenum, about 2.5% silicon, and a balance of cobalt;

an alloy including a composition, by weight, of about 14% chromium, about 27% molybdenum, about 2.6% silicon, and a balance of cobalt;

an alloy including a composition, by weight, of about 18% chromium, about 28% molybdenum, about 3.4% silicon, and a balance of cobalt;

an alloy including a composition, by weight, of about 10% nickel, about 25% chromium, about 7.5% tungsten, about 0.45% carbon, and a balance of cobalt;

an alloy including a composition, by weight, of about 10% nickel, about 25% chromium, about 7.5% tungsten, about 0.5% manganese, about 0.9% silicon, and a balance of cobalt;

an alloy including a composition, by weight, of about 29% chromium, about 7% tungsten, about 10% nickel, about 0.6% carbon, and a balance of cobalt;

copper alloys, an alloy including a composition, by weight, of at least about 63% nickel, up to about 2.5% iron, up to about 2% manganese, up to about 0.5% silicon, and a balance of copper;

an alloy including a composition, by weight, of at least about 63% nickel, up to about 2.5% iron, up to about 2% manganese, and a balance of copper;

an alloy including a composition, by weight, of about 54.5% nickel, up to about 0.5% iron, up to about 0.1% manganese, up to about 0.1% silicon, up to about 0.05% aluminum, and a balance of copper;

an alloy including a composition, by weight, of at least about 63% nickel, up to about 2% iron, up to about 1.5% manganese, up to about 0.5% silicon, about 2.75% aluminum, about 0.6% titanium, and a balance of copper;

an alloy including a composition, by weight, of at least about 63% nickel, up to about 2.5% iron, up to about 2% manganese, up to about 0.5% silicon, up to about 0.05% aluminum, and a balance of copper;

aluminum bronzes, an alloy including a composition, by weight, of about 21.5% chromium, about 5% iron, about 9% molybdenum, about 3.65% niobium, about 1% cobalt, about 0.5% manganese, about 0.4% aluminum, about 0.4% titanium, about 0.5% silicon, about 0.1% carbon, and a balance of nickel;

an alloy including a composition, by weight, of about 19% chromium, about 18.5% iron, about 3% molybdenum, about 3.6% niobium and tantalum, and a balance of nickel;

an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel; and combinations thereof.

4. The turbine component assembly of claim 1, wherein the CMC composition of the first component is selected from the group consisting of aluminum oxide-fiber-reinforced aluminum oxides (Ox/Ox), carbon-fiber-reinforced silicon carbides (C/SiC), silicon-carbide-fiber-reinforced silicon carbides (SiC/SiC), carbon-fiber-reinforced silicon nitrides (C/Si$_3$N$_4$), silicon-carbide-fiber-reinforced silicon nitrides (SiC/Si$_3$N$_4$), and combinations thereof.

5. The turbine component assembly of claim 1, wherein the second component includes a material composition selected from the group consisting of iron alloys, steels, stainless steels, carbon steels, nickel alloys, superalloys, nickel-based superalloys, an alloy including a composition, by weight, of about 19% chromium, about 18.5% iron, about 3% molybdenum, about 3.6% niobium and tantalum, and a balance of nickel, an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel, an alloy including a composition, by weight, of about 15.5% chromium, about 7% iron, about 2.5% titanium, about 0.7% aluminum, and about 0.5% niobium and tantalum, and a balance of nickel, an alloy including a composition, by weight, of about 19% chromium, about 11% cobalt, about 10% molybdenum, about 1.5% aluminum, about 3.1% titanium, and a balance of nickel, cobalt-based superalloys, an alloy including a composition, by weight, of about 20% chromium, about 10% nickel, about 15% tungsten, about 0.1% carbon, about 1.5% manganese, and a balance of cobalt, and combinations thereof.

6. The turbine component assembly of claim 1, wherein the interface shield is co-cast on the first component.

7. The turbine component assembly of claim 1, wherein the interface shield is bonded to the first component.

8. The turbine component assembly of claim 1, wherein the interface shield is removably secured to the first component.

9. The turbine component assembly of claim 1, wherein the first component is an inner shroud, and the second component is an outer shroud.

10. The turbine component assembly of claim 9, wherein the contact region is a hook region of the inner shroud.

11. The turbine component assembly of claim 10, wherein the interface shield is an interface clip having a u-shaped cross-section sized to contact the hook region with a first surface of the interface clip, a second surface of the interface clip, and a third surface of the interface clip.

12. The turbine component assembly of claim 1, wherein the interface shield reduces wear of the first component relative to the comparative assembly.

13. The turbine component assembly of claim 1, further including a plurality of interface shields disposed on a plurality of contact regions of the first component and directly contacting the second component.

14. The turbine component assembly of claim 1, wherein the interface shield includes a hard wear surface coating directly contacting the second component.

15. The turbine component assembly of claim 14, wherein the hard wear surface coating is selected from the group consisting of:

an alloy including, by weight, about 33% chromium, about 2.45% carbon, about 18% molybdenum, about 0.5% silicon, and a balance of cobalt;
an alloy including, by weight, about 30% chromium, about 4.5% tungsten, about 1.2% carbon, and a balance of cobalt;
an alloy including, by weight, about 29% chromium, about 4.5% tungsten, about 1.2% carbon, and a balance of cobalt;
an alloy including, by weight, about 30% chromium, about 4.5% tungsten, about 1.7% carbon, and a balance of cobalt;
an alloy including, by weight, about 28% chromium, about 3% nickel, about 5.2% molybdenum, about 0.25% carbon, and a balance of cobalt;
an alloy including a composition, by weight, of about 8.5% chromium, about 28% molybdenum, about 2.5% silicon, and a balance of cobalt;
an alloy including a composition, by weight, of about 14% chromium, about 27% molybdenum, about 2.6% silicon, and a balance of cobalt;
an alloy including a composition, by weight, of about 18% chromium, about 28% molybdenum, about 3.4% silicon, and a balance of cobalt;
an alloy including a composition, by weight, of about 10% nickel, about 25% chromium, about 7.5% tungsten, about 0.45% carbon, and a balance of cobalt;
an alloy including a composition, by weight, of about 10% nickel, about 25% chromium, about 7.5% tungsten, about 0.5% manganese, about 0.9% silicon, and a balance of cobalt;
an alloy including a composition, by weight, of about 29% chromium, about 7% tungsten, about 10% nickel, about 0.6% carbon, and a balance of cobalt;
copper alloys,
an alloy including a composition, by weight, of at least about 63% nickel, up to about 2.5% iron, up to about 2% manganese, up to about 0.5% silicon, and a balance of copper;
an alloy including a composition, by weight, of at least about 63% nickel, up to about 2.5% iron, up to about 2% manganese, and a balance of copper;
an alloy including a composition, by weight, of about 54.5% nickel, up to about 0.5% iron, up to about 0.1% manganese, up to about 0.1% silicon, up to about 0.05% aluminum, and a balance of copper;
an alloy including a composition, by weight, of at least about 63% nickel, up to about 2% iron, up to about 1.5% manganese, up to about 0.5% silicon, about 2.75% aluminum, about 0.6% titanium, and a balance of copper;
an alloy including a composition, by weight, of at least about 63% nickel, up to about 2.5% iron, up to about 2% manganese, up to about 0.5% silicon, up to about 0.05% aluminum, and a balance of copper;
aluminum bronzes,
an alloy including a composition, by weight, of about 21.5% chromium, about 5% iron, about 9% molybdenum, about 3.65% niobium, about 1% cobalt, about 0.5% manganese, about 0.4% aluminum, about 0.4% titanium, about 0.5% silicon, about 0.1% carbon, and a balance of nickel;
an alloy including a composition, by weight, of about 19% chromium, about 18.5% iron, about 3% molybdenum, about 3.6% niobium and tantalum, and a balance of nickel;
an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel; and
combinations thereof.

16. The turbine component assembly of claim 1, wherein the interface shield is in non-transitory direct contact with the second component.

17. A turbine shroud assembly, comprising:
an inner shroud arranged to be disposed adjacent to a hot gas path, the inner shroud including a ceramic matrix composite (CMC) composition;
an outer shroud adjacent to the inner shroud and arranged to be disposed distal from the hot gas path across the inner shroud; and
an interface shield disposed on a hook region of the inner shroud, the interface shield being in non-transitory direct contact with the outer shroud,
wherein the interface shield is free of spring coils, elastomers, and woven metal meshes,
wherein the hook region of the inner shroud is partially inserted into the outer shroud, and
wherein the turbine shroud assembly including the interface shield includes a higher wear resistance than a comparative shroud assembly not including the interface shield disposed between the inner shroud and the outer shroud.

18. The turbine shroud assembly of claim 17, wherein the interface shield is an interface clip having a u-shaped cross-section sized to contact the hook region with a first surface of the interface clip, a second surface of the interface clip, and a third surface of the interface clip.

19. A turbine nozzle assembly, comprising:
a nozzle end wall arranged to be disposed adjacent to a hot gas path, the nozzle end wall including a ceramic matrix composite (CMC) composition;
a nozzle outer wall adjacent to the nozzle end wall and arranged to be disposed distal from the hot gas path across the nozzle end wall; and
an interface shield disposed on a contact region of the nozzle end wall, the interface shield being in non-transitory direct contact with the nozzle outer wall,
wherein the interface shield is free of spring coils, elastomers, and woven metal meshes,
wherein the turbine nozzle assembly including the interface shield includes a higher wear resistance than a comparative nozzle assembly not including the interface shield disposed between the nozzle end wall and the nozzle outer wall, and
wherein the interface shield reduces thermal binding relative to the comparative nozzle assembly.

* * * * *